United States Patent [19]

Weber

[11] Patent Number: 5,276,717

[45] Date of Patent: Jan. 4, 1994

[54] METHOD OF AND APPARATUS FOR GENERATING NEUTRINOS AND/OR ANTINEUTRINOS, A NEUTRINO MODULATION METHOD, AND A NEUTRINO BEAM GENERATOR

[76] Inventor: Joseph Weber, 9 W. Melrose St., Chevy Chase, Md. 20815

[21] Appl. No.: 675,248

[22] Filed: Mar. 26, 1991

[51] Int. Cl.$^5$ ............................................. H04B 14/00
[52] U.S. Cl. ..................... 376/156; 376/913; 455/899; 332/149; 375/68
[58] Field of Search ................. 376/156, 913, 153; 455/620, 899; 332/149; 375/68

[56] References Cited

U.S. PATENT DOCUMENTS

| | | | |
|---|---|---|---|
| 3,970,936 | 7/1976 | Arnold | 455/620 |
| 4,164,680 | 8/1979 | Villalobos | 376/156 X |
| 4,205,268 | 5/1980 | Eerkens | 455/899 |
| 4,576,777 | 3/1986 | Weber | 376/153 |
| 4,657,722 | 4/1987 | Bennett | 376/156 X |
| 4,732,728 | 3/1988 | Weber | 376/153 |
| 4,968,475 | 11/1990 | Drukier et al. | 376/153 |

OTHER PUBLICATIONS

Marshak et al., *Intro. to Elementary Particle Physics;* (Interscience Pub., Inc.; N.Y., 1961; pp. 1-3).
*Encyclopedia Britannica* (15th Ed.), vol. 28, pp. 252-256, "Subatomic Particles".
J. Weber, "New Methods For Neutrino Detection, and Solar Neutrino Interactions with a Single Crystal Earth Core"; World Scientific Publishers, 1991.
P. Howden, "A Paean to the Moon from an Early Believer"; Electronic Design, (vol. 23, Nov. 9, 1972, p. 7.
"Neutrino Beams Would Carry Coded Secrets Through Earth"; The Washington Post, (Wednesday, Apr. 26, 1978), p. A10.

*Primary Examiner*—Bernarr E. Gregory
*Attorney, Agent, or Firm*—Lowe, Price, LeBlanc & Becker

[57] ABSTRACT

Neutrinos and antineutrinos are generated by electromagnetic excitation of elementary subatomic particle magnetic moments in a DC magnetic field and causing the orientation energy of magnetic moments resulting from such excitation to be converted into the neutrinos and/or antineutrinos. A beam of neutrinos and antineutrinos is derived by enclosing a neutrino antineutrino source with neutrino scattering crystals having an aperture therein. Neutrinos and/or antineutrinos are amplitude modulated by varying the amplitude of electromagnetic excitation of the elementary particle magnetic moments, or the DC field or momentum mechanically imparted to a stiff crystal including the subatomic particles.

19 Claims, 4 Drawing Sheets

METHOD OF AND APPARATUS FOR GENERATING NEUTRINOS AND/OR ANTINEUTRINOS, A NEUTRINO MODULATION METHOD, AND A NEUTRINO BEAM GENERATOR

FIELD OF INVENTION

The present invention relates generally to generating neutrinos and antineutrinos and more particularly to a method of and apparatus for generating neutrinos and antineutrinos by electromagnetic excitation of elementary subatomic particle magnetic moments in a DC magnetic field and causing the orientation energy of magnetic moments resulting from such excitation to be converted into the neutrinos and/or antineutrinos. In accordance with a further aspect of the invention, a beam of neutrinos and antineutrinos is derived by enclosing a neutrino antineutrino source with neutrino scattering crystals having an aperture therein. In another aspect of the invention neutrinos and/or antineutrinos are amplitude modulated by varying the amplitude of electromagnetic excitation of the elementary particle magnetic moments, or the DC field or momentum mechanically imparted to a stiff crystal including the subatomic particles.

BACKGROUND ART

Neutrinos and antineutrinos are presently generated by radioactive beta decay, man-made nuclear reactors and nuclear processes in the sun and other stars. Generation of neutrinos and antineutrinos from any of these sources has certain disadvantages. Neutrino and antineutrino emission from heavenly bodies is basically random and unpredictable. Hence, amplitude modulation of neutrinos emitted from heavenly bodies is not feasible. While neutrino and antineutrino emission from radioactive beta decay sources and man-made nuclear reactors is relatively predictable and can therefore be reliably amplitude modulated, such sources pose certain problems with regard to health of personnel located in proximity thereto, and are relatively expensive. Of course, it is desirable to provide neutrino sources having predictable, relatively constant amplitude, so that such sources can be amplitude modulated for communication purposes. These problems of prior art neutrino antineutrino sources could be overcome if electrical energy could be employed to power a neutrino source.

Neutrino and antineutrino communication is highly desirable because of the capability of neutrinos and antineutrinos to penetrate the earth and propagate between diametrically opposed points on the surface of the earth. In addition, the frequency of neutrino and antineutrino propagation, approximately $3 \times 10^{20}$ Hz, enables many messages to be modulated on neutrino and antineutrino emissions.

Neutrino and antineutrino emissions are generally isotropic. For communication applications, it is desirable for a beam of neutrinos to be derived from an anisotropic neutrino antineutrino source.

It is, accordingly, an object of the present invention to provide a new and improved apparatus for and method of generating neutrinos and/or antineutrinos; in the claims of this document, the generic term "neutrino type particles" is used to designate neutrinos and/or antineutrinos.

Another object of the invention is to provide a new and improved neutrino antineutrino source wherein electric power is used as an excitation source, rather than nuclear reactor or beta decay sources.

Another object of the present invention is to provide a new and improved method of and apparatus for generating neutrinos and/or antineutrinos, which method and apparatus is particularly suited for deriving neutrino emissions that can be modulated.

A further object of the present invention is to provide a new and improved apparatus for generating a neutrino beam.

An additional object of the present invention is to provide a new and improved neutrino antineutrino source that derives a predictable, relatively constant level of neutrinos and antineutrinos.

In my earlier U.S. Pat. Nos. 4,576,777 and 4,732,728, respectively issued Mar. 18, 1986 and Mar. 22, 1988, there are disclosed methods and structures for detecting neutrino antineutrino energy. In the '777 patent coherent inelastic neutrino antineutrino scatterers are employed, while in the '728 patent elastic neutrino antineutrino scatterers are used. In the '777 patent, individual atoms in a stiff crystal absorb energy from the neutrino and/or antineutrino particles to scatter the particles and produce stimulated coherent radiant energy fields. The coherent fields produced by the individual atoms are detected to provide an indication of the presence of the neutrino or antineutrino particles in the beam.

The crystals employed in my prior art patents are relatively large and nearly perfect, having great stiffness, i.e., high Debye temperatures. Momentum of incident neutrinos or antineutrinos is exchanged by quarks in nuclei of atoms forming the crystal when energy is exchanged with a nuclear spin system in a magnetic field. The entire crystal recoils as a single entity. Detection is accomplished by observing changes in nuclear spin system temperature.

In the processes and apparatus of my aforementioned prior patents, one or a very small number of nuclei in the very stiff crystal scatters neutrinos or antineutrinos by momentum exchange, by one or a very small number of nuclei. Momentum exchange at a nucleus is quickly transferred to the crystal center of mass. Usually, the entire crystal recoils as a single entity, without exciting sound vibrations in the crystal. The scattering site cannot be determined by subsequent measurements, an important feature in obtaining a high probability process.

In my '777 patent, nuclear magnetic resonance techniques are employed for neutrino and antineutrino detection. A bulk material having nuclei with non-zero spin non-zero magnetic moments is employed. The material has sufficient stiffness to recoil as a single entity after absorbing momentum from each neutrino or antineutrino incident thereon. Exemplary materials are described as crystals of sapphire or silicon, respectively including the isotopes 27Al and 29Si, that exhibit nuclear magnetic resonance properties when excited with appropriate magnetic fields. While the material is irradiated by neutrinos or antineutrinos, a magnetic field applied to it causes the nuclei to normally precess about the magnetic field longitudinal axis at a predetermined angle. The neutrino may cause a shift in the nuclei precessing angle or may modify the quantum states of the nuclei spins by altering correlations established by applied electromagnetic fields. The nuclei changes are detected by using a nuclear magnetic resonance detecting apparatus. The magnetic field intensity necessary to detect the nuclear magnetic resonance field is quantified in the '777 patent as $$H = \frac{E_v}{4\mu_m\beta\sqrt{2N}}$$

where:
- $E_v$ = the energy of neutrinos in the beam;
- $\mu_m$ = the scattering nuclear magnetic moment of the material;
- $\beta^2$ = the fraction of nuclei of the material with moments parallel to the direction of the magnetic field; and
- $N$ = the total number of neutrino scatterers of the material.

A crystal is considered to be stiff if it has the proper recoil properties as represented by a crystal Debye temperature exceeding 500° Kelvin. This definition of a stiff crystal is employed in the present specification and claims.

In accordance with one feature of the '728 patent, neutrino and/or antineutrino particles in a beam incident on scatterers of a crystal mounted on a mechanical resonator are amplitude modulated at the resonant frequency of the mechanical resonator or a harmonic thereof. The amplitude modulation is provided by chopping the neutrino or antineutrino beam incident on the crystal containing elastic coherent scatterers mounted on the mechanical resonator. The neutrino beam is preferably chopped by mounting a plurality of scatterers for the neutrino and/or antineutrino particles in the beam on a structure turned by a motor. Such a modulation mechanism, however, does not provide amplitude modulation in response to variable amplitude signals. Hence in my prior art modulator amplitude variations of a modulation source does not result in a concomitant variation of neutrino antineutrino emissions.

Accordingly, a further object of the present invention is to provide a new and improved neutrino antineutrino amplitude modulator.

An additional object of the invention is to provide a new and improved method of and apparatus for amplitude modulating neutrinos and/or antineutrinos in response to a variable amplitude signal so that as variations in the amplitude of the signal occur there are concomitant variations in the amplitude of the neutrinos and/or antineutrinos derived from the modulator or by the modulation process.

An additional object of the present invention is to provide a new and improved method of and apparatus for amplitude modulating neutrinos and/or antineutrinos, wherein the transparency of a scatterer to neutrinos is controlled for the neutrinos and/or antineutrinos in response to the amplitude of a modulating signal.

THE INVENTION

In accordance with one aspect of the present invention, neutrinos and/or antineutrinos are generated by applying energy including a magnetic component (for example, an r.f. magnetic field or radiant electromagnetic energy) to a crystal in a DC magnetic field. The energy including the magnetic component causes orientation energy of magnetic moments of elementary particles, i.e., nuclei, electrons or ions, in the crystal to be converted to neutrinos and/or antineutrinos. The crystal is characterized such that neutrino-antineutrino scatterers therein are sufficiently stiff so as to recoil as a single entity in response to neutrinos and/or antineutrinos being incident thereon.

If the elementary particles are nuclei, the crystal is a low dislocation dielectric or semiconductor, preferably selected from the group including sapphire, silicon and diamond, and the energy including the magnetic component is radio frequency energy magnetically coupled to the crystal. The radio frequency energy is at a frequency of a nuclear magnetic resonance of nuclei in the crystal; the frequency of the nuclear magnetic resonance is determined by the magnitude of the DC magnetic field.

If the elementary particles are electrons, the crystal is formed as a low dislocation semiconductor capable of laser emission, such as low dislocation gallium arsenide. In this case, the energy including the magnetic component is radiant electromagnetic energy that is incident on the crystal. The radiant electromagnetic energy is, in such an instance, optical energy, preferably coherent monochromatic optical energy derived from a laser at a frequency of electron paramagnetic resonance of electrons in the crystal. The electrons have orientation energy converted by the magnetic field component to neutrino antineutrino pairs.

The elementary particles can also be ions, in which case radiant electromagnetic energy incident on the crystal is microwave or optical energy at a frequency of ion paramagnetic resonance of ions in the crystal. The frequency of ionic paramagnetic resonance is determined by the magnitude of the DC magnetic field. Similarly, for electron paramagnetic resonance of electrons in the crystal, the frequency of the optical energy is determined by the magnitude of the DC magnetic field.

The DC magnetic field can be applied by an external field to a single dielectric, stiff crystal or the single dielectric stiff crystal can include its own internal DC magnetic field. The internal magnetic field must be sufficiently large to satisfy the aforementioned relationship of:

$$H = \frac{E_v}{4\mu_m\beta\sqrt{2N}}$$

Yttrium garnets, as well as certain iron and nickel alloys, include internal DC magnetic fields and can be formed as single dielectric crystals having the stated stiffness. The term "in a DC magnetic field" as used in the claims of the present document is thus intended to include a DC magnetic field supplied to a crystal by an external source or a DC magnetic field that is derived internally of the crystal.

In accordance with a further aspect of the invention, an apparatus for generating neutrinos and/or antineutrinos comprises a source of energy including a magnetic field component and crystal means responsive to the energy source and DC magnetic field. The energy source activates the crystal means so orientation energy of magnetic moments of elementary particles in the crystal is converted to neutrinos and/or antineutrinos.

The DC magnetic field is established preferably by an external DC magnetic field source but may result from an internal DC magnetic field within the crystal as discussed supra.

In a preferred embodiment, the crystal means includes an electro-mechanical transducer bonded to a single crystal including neutrino antineutrino scatterers that are sufficiently stiff so as to recoil as a single entity in response to neutrinos and/or antineutrinos being incident thereon. Electric energy is applied to the transducer so that the transducer and crystal vibrate together without setting up acoustic waves in the crystal. To this end, the electric energy applied to the transducer has a frequency that is resonant to the mechanical resonant frequency of an assembly including the transducer and crystal so the crystal oscillates as a single entity lumped mass. To maximize the amplitude of oscillations imparted to the transducer and crystal assembly, opposed faces of the transducer are bonded to a different single crystal. The electric energy is applied to the transducer so that the transducer and each crystal vibrate together, without setting up acoustic waves in the crystals.

In accordance with still another aspect of the invention, DC magnetic lines of flux are established in a region containing an assembly including a single crystal bonded to a face of an electro-mechanical transducer responsive to a source of AC energy having a frequency causing the transducer and crystal to vibrate together without setting up acoustic waves in the crystal. The crystal responds to energy from another source having a frequency causing nuclear magnetic resonance, paramagnetic electron resonance or paramagnetic ion resonance in the crystal. The frequency of the energy source causing the subatomic particle resonance is determined by the atomic species and magnitude of the magnetic field in the region incident on the crystal.

In the foregoing combination, the subatomic particles are either nuclei, electrons or ions. If the subatomic particles are nuclei, the energy applying source includes a coil for coupling an rf magnetic field to the crystal to cause magnetic resonance of nuclei in the crystals. If the subatomic particles are ions or electrons, the energy applying source directs a radiant electromagnetic energy field to the crystal to cause paramagnetic resonance of ions or electrons in the crystal.

Any of these sources can be amplitude modulated by controlling the amplitude of AC energy coupled to the transducer. Alternatively, the amplitude of the source causing magnetic or paramagnetic resonance of subatomic particles in the crystal is varied to cause neutrino or antineutrino amplitude modulation. In a further embodiment, the magnitude of the DC magnetic field incident on the crystal is varied to cause amplitude modulation of neutrinos or anti-neutrinos derived from the combination.

In accordance with a further aspect of the invention, neutrinos and/or antineutrinos are amplitude modulated in response to a variable amplitude input signal by varying the neutrino transparency of a stiff crystal in the path of neutrinos and/or antineutrinos. A DC magnetic field and a further field having a magnetic component are applied to the crystal to cause resonant magnetic or paramagnetic resonance of subatomic particles in the crystal. The amplitude of one of the fields is varied in response to the amplitude of the input signal to cause a concomitant variation in the rate of the neutrinos and/or antineutrinos that propagate through the crystal, to cause neutrino antineutrino modulation.

In accordance with a further aspect of the invention, a communication apparatus responsive to a variable amplitude input signal comprises a source of neutrinos and/or antineutrinos, in combination with a neutrino scattering material in the path of the neutrinos and/or antineutrinos, and means responsive to the signal for altering the material to vary the rate of the neutrinos and/or antineutrinos that propagate through the material. Thereby, as the amplitude of the signal changes there are concomitant changes in the rate of the neutrinos and/or antineutrinos that propagate through the material. The scattering material is a stiff crystal. The means for altering the material includes means for applying a DC magnetic field and a further field having a magnetic component to the crystal to cause magnetic or paramagnetic resonance of subatomic particles in the crystal. The amplitude of one of these fields is varied in response to the amplitude of the input signal to vary the rate of the neutrinos and/or antineutrinos that propagate through the crystal.

In accordance with still another aspect of the invention, a generator of neutrinos and/or antineutrinos is in combination with an assemblage of stiff single crystals forming an enclosure around the generator. The assemblage includes an aperture through which the neutrinos and/or antineutrinos from the generator propagate to form a beam of neutrinos and/or antineutrinos. The stiff single crystals restrict the output of neutrinos or antineutrinos from the enclosure, causing the neutrino and/or antineutrino density to increase until the leakage rate of the neutrinos and/or antineutrinos propagating through the aperture equals the rate at which these particles are derived by the generator. The aperture in the enclosure permits directivity and control of the neutrinos derived from the generator, to provide basically a collimated beam of neutrinos and/or antineutrinos. The resulting neutrino and/or antineutrino beam can be amplitude modulated by the previously discussed amplitude modulation techniques and structures.

The above and still further objects, features and advantages of the present invention will become apparent upon consideration of the following detailed description of several specific embodiments thereof, especially when taken in conjunction with the accompanying drawings.

DESCRIPTION OF THE PREFERRED EMBODIMENT AND OF EXPLANATORY MATERIAL

Figure 1:
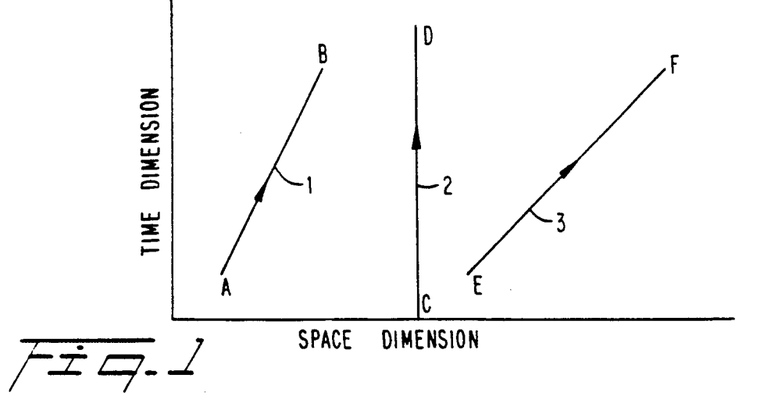
FIG. 1 includes a series of traces helpful in describing the traces of FIGS. 2 and 3.

Reference is now made to FIG. 1 of the drawing, wherein straight line traces 1, 2 and 3 are illustrated for three different situations, as plotted in a spatial dimension versus time dimension domain. The spatial dimension, in the horizontal direction, represents linear position along an x axis. The time dimension is represented by t in the vertical direction multiplied by c, the speed of light, for dimensional consistency with the x axis. Straight line trace 1 is the track of an elementary, subatomic particle, such as an electron, nucleus or ion, moving to the right with some velocity v, at coordinate position $x = vt = (v/c)ct$. The slope of trace 1 is $c/v$. Vertical trace 2 represents a particle at rest, indicated by a constant value of x as the value of t increases. A subatomic particle moving with close to the speed of light has a slope, indicated by $c/v$, of approximately 1, as represented by trace 3.

Figure 2:
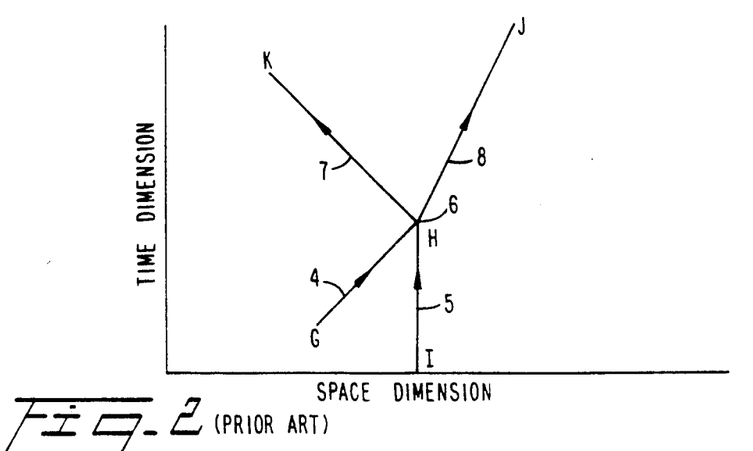
FIG. 2 includes a series of traces helpful in describing the manner in which neutrinos are scattered in accordance with my prior art U.S. Pat. No. 4,576,777.

FIG. 2 is a representation of the motion of a neutrino, as incident on a nucleus in a stiff, neutrino scattering material, as described in my previously mentioned patents. The motion of the neutrino, prior to being incident on the nucleus, is represented by straight line trace 4, having a slope of 45° since neutrinos travel at or near the speed of light. The neutrino represented by trace 4 is moving toward a stationary nucleus in a stiff scatterer material having a spatial-time situation represented by vertical line 5. At intersection 6 of traces 4 and 5, the neutrino and nucleus collide, causing the neutrino to be scattered, as indicated by straight line trace 7, having a slope close to 45°, to indicate that the scattered neutrino is travelling at or near the speed of light, but in a direction back toward the region where the neutrino was originally launched. In response to the collision between the neutrino represented by trace 4 and the nucleus represented by trace 5, the nucleus moves away from the scattering crystal, as represented by trace 8. Hence, the nucleus and neutrino are moving in opposite directions as a result of the scattering action by the nucleus on the incident neutrino. The nucleus moves in the same general direction as the original movement direction of the neutrino incident on the crystal.

Figure 3:
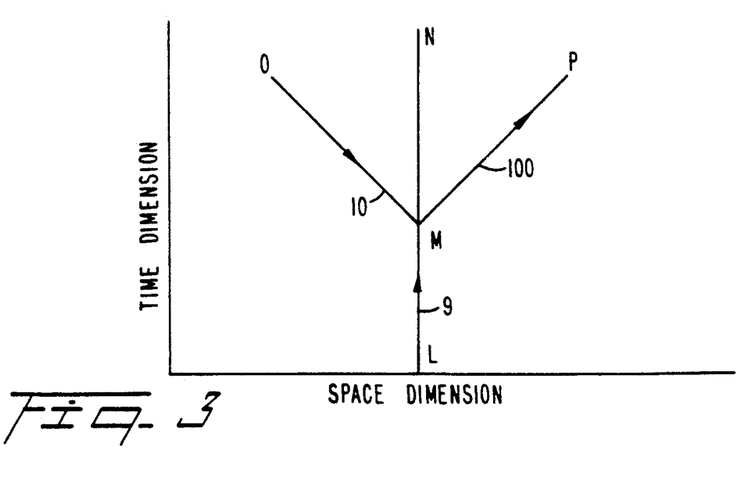
FIG. 3 is a series of traces useful in describing the principles of operation of the present invention.

Modern elementary particle physics principles imply that the process of FIG. 2 may be reversed or rotated, as schematically shown in FIG. 3. In FIG. 3, vertically directed straight line trace 9 represents the position of a nucleus in a stiff scatterer at rest, with the assumption that no neutrinos and/or antineutrinos are present at time $t = 0$. At time M a neutrino and antineutrino are simultaneously created in the scatterer. The neutrino and antineutrino space versus time tracks are represented by straight lines 10 and 100, which intersect trace 9 at time M. The elementary particle conservation laws require that particles, such as neutrinos, electrons or ions, be created in pairs. Each pair consists of a particle and an antiparticle, i.e., a neutrino and antineutrino or an electron and a positron. From FIGS. 2 and 3, it is implied that modification of the detector associated with FIG. 2 can result in a neutrino antineutrino pair generator, as well as of electron and positron pairs.

Figure 4:
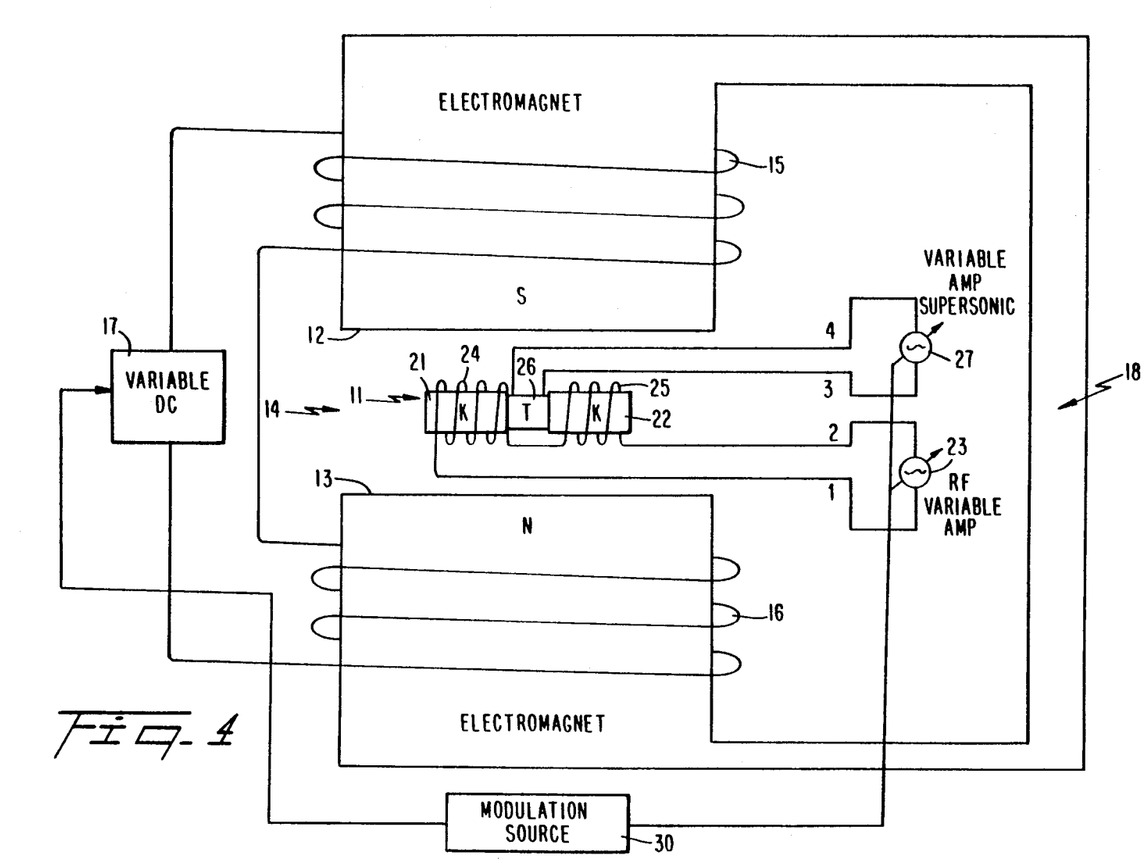
FIG. 4 is a schematic diagram of a preferred embodiment of the invention for generating neutrino antineutrino pairs, wherein nuclear magnetic resonance techniques are employed.

An apparatus for generating neutrino antineutrino particles based on the principles described in connection with FIGS. 2 and 3 is illustrated in FIG. 4 as including assembly 11, located in a DC magnetic field applied by pole faces 12 and 13 to gap 14 by an electromagnet including coils 15 and 16, energized by variable amplitude DC source 17. Coils 15 and 16 are wound on legs of a high magnetic permeability structure 18 (e.g., iron), to produce linearly directed magnetic lines of flux in gap 14 and assembly 11. Alternatively, a superconducting coil magnetic field could be employed.

In the embodiment illustrated in FIG. 4, assembly 11 includes large nearly perfect dielectric crystals 21 and 22 having great stiffness. The nearly perfect crystal must have very low dislocation density, e.g. hundreds of dislocations per cubic centimeter. A stiff crystal is defined herein.

Each of dielectric crystals 21 and 22 is a single crystal, preferably fabricated of silicon, sapphire, diamond or some other stiff, nearly perfect crystal material including nuclei having quantum states that achieve magnetic resonance in response to the frequency and amplitude of the magnetic field applied thereto by RF source 23 and series connected coils 24 and 25 which are wound in the same direction on crystals 21 and 22. Crystals 21 and 22 are positioned so that the longitudinal axes thereof are coincident and at right angles to the DC magnetic flux lines between pole faces 12 and 13.

Crystals 21 and 22 are bonded, preferably by an epoxy dielectric glue, to opposed faces of electromechanical piezoelectric transducer 26. The opposed faces of transducer 26 are aligned with the DC magnetic lines of flux between pole faces 12 and 13 so these magnetic flux lines are at right angles to lines of magnetic flux induced in crystals 21 and 22 by coils 24 and 25. A variable amplitude voltage having a supersonic frequency, i.e., between 20 kHz and 100 kHz, is applied to electrodes (not shown) of transducer 26 by source 27. The voltage applied by source 27 to transducer 26 causes opposite faces of the transducer, bonded to the opposed faces of crystals 21 and 22, to simultaneously compress and expand relative to a mechanically clamped center line through transducer 26 between its end faces. Hence, during a first half cycle of source 27 crystals 21 and 22 move toward transducer 26; during the following half cycle of source 27 the crystals move away from the transducer. Transducer 27 thus imparts momentum to crystals 21 and 22. The momentum is combined with the nuclear magnetic resonance effects coupled to crystals 21 and 22 by the fields from coils 15, 16, 24 and 25 to cause neutrino antineutrino pairs to be derived from the crystals.

The frequency of source 27 is selected to equal the mechanical resonant frequency of the assembly including crystals 21 and 22, and transducer 26. By selecting the frequency of source 27 to be resonant with the assembly consisting of crystals 21 and 22 and transducer 26, acoustic waves are not established inside of crystals 21 or 22. Thus, crystal 21 oscillates as a single entity lumped mass as does crystal 22. Oscillation of each crystal as a single entity lumped mass enables sufficient momentum to be imparted by transducer 26 to crystals 21 and 22 to generate neutrino antineutrino pairs.

The frequency of source 23 is selected so that a magnetic resonance radio frequency field for nuclei in crystals 21 and 22 is applied by the source to coils 24 and 25. The magnetic resonance radio frequency field applied to crystals 21 and 22 raises the magnetic moment-magnetic field interaction of all nuclei having the same magnetic moment in crystals 21 and 22. These nuclei then transfer part of the energy thereof to the neutrino antineutrino pairs.

In certain situations, it is desirable to utilize only a single stiff crystal having nuclei that are magnetically resonant to the field in gap 14 and to impart momentum to the crystal by a large transducer. However, the use of two crystals, as illustrated, on opposite sides of a single transducer, improves efficiency and reduces mechanical oscillations coupled to the other equipment, which implies that a lower energy level can be applied to the transducer by the electric source driving it.

Power generated in the form of neutrino-antineutrino pairs for energies in the 50,000 electron volt region is given approximately by $$P = \frac{\pi G_\omega^2 E_\nu^3 [N_T - Z_T(1 - \sin^2\theta_W)]^2}{\hbar^4 c^3 \nu}$$

where P is the generated power,
$G_\omega$ is the Fermi weak interaction constant,
$E_\nu$ is the energy of one neutrino or antineutrino,
$N_T$ is the total number of neutrons,
$Z_T$ is the total number of protons,
$\theta_\omega$ is the Weinberg angle,
$\hbar$ is Planck's constant divided by $2\pi$,
c is the speed of light, and
V is the combined volume of crystals 21 and 22.

The energy of each neutrino or antineutrino resulting from the generation of the neutrino-antineutrino pairs in the 50,000 electron volt region is given in terms of ;the magnetic resonance angular frequency, $\omega_m$ (the frequency of source 23), by $$E_\nu \approx \hbar \omega_m \left(\frac{3}{2} N\right)^{\frac{1}{3}}$$

where N is the total number of nuclei with magnetic moments.

Exchange of energy in crystals 21 and 22 must occur without single site identification. In the structure of FIG. 4, energy is exchanged with the electric sources driving crystals 21 and 22 by making use of the quantum states of nuclei in crystals 21 and 22 with magnetic moments resulting from the interaction of the magnetic fields applied to the crystals by coils 24 and 25 and the DC magnetic field applied by pole faces 12 and 13 to gap 14.

The neutrino antineutrino particles generated by the structure illustrated in FIG. 4 can be modulated in amplitude by varying the magnitude of the DC magnetic field applied to assembly 11. As the DC magnetic field magnitude changes there are simultaneous changes in the frequency of source 23 so an approximate nuclear magnetic resonance is retained in crystals 21 and 22. Neutrino antineutrino amplitude modulation implies varying the rate at which the neutrino and antineutrino pairs are generated by the structure illustrated in FIG. 4. The DC magnetic field magnitude is controlled by the amplitude of current supplied by DC source 17 to coils 15 and 16. Amplitude modulation can also be attained by varying the amplitude of the current applied to coils 24 and 25 by source 23 or the amplitude of the voltage of source 27. The amplitude of any of these parameters is controlled by the amplitude of the signal from modulation source 30. As the amplitude of source 30 varies there are concomitant variations in the output of one of sources 17, 23 or 27 and concomitant variations in the rate at which neutrino antineutrino pairs are generated by the structure of FIG. 4.

Figure 5:
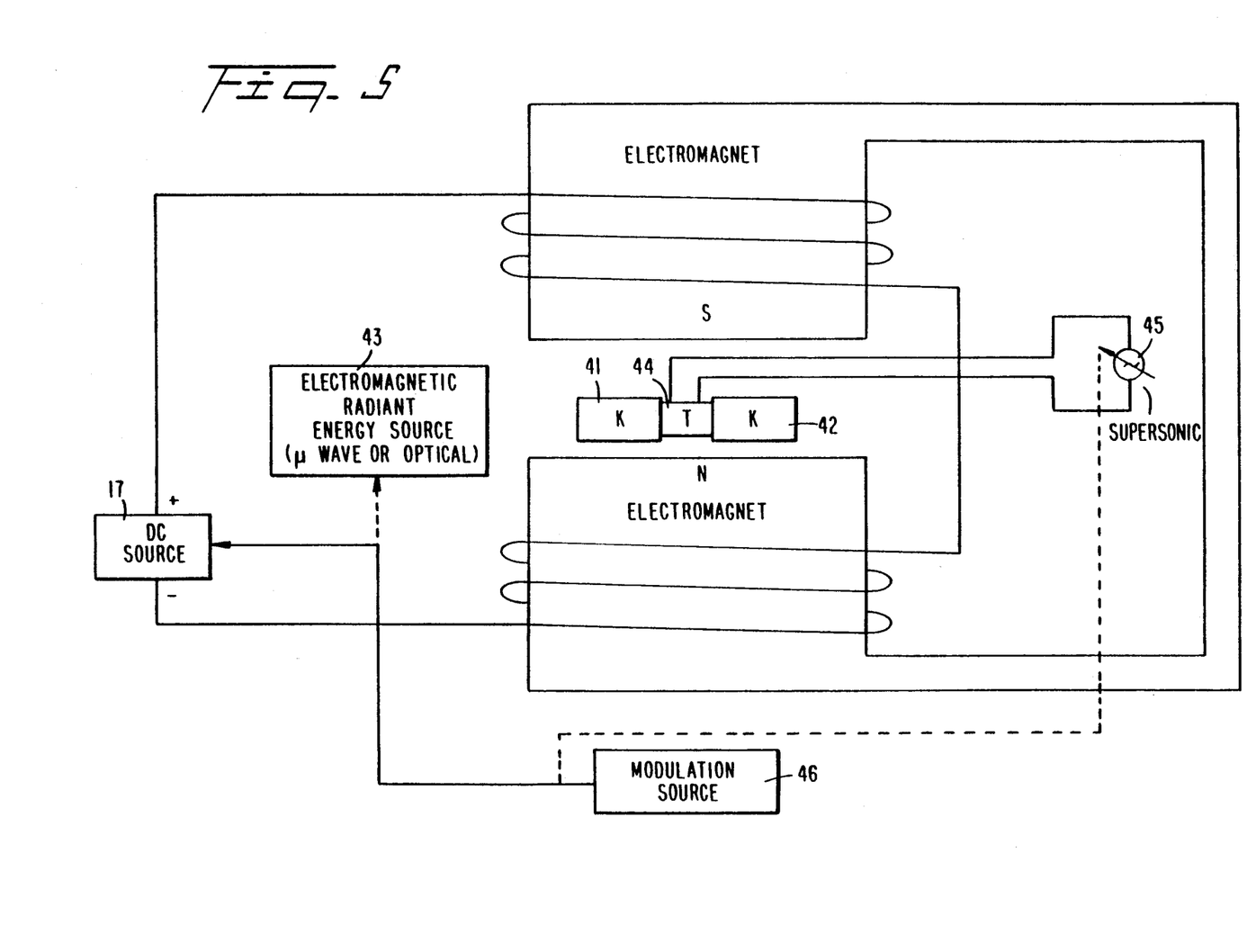
FIG. 5 is an embodiment of a neutrino antineutrino generator in accordance with the present invention wherein electron or ion paramagnetic resonance is employed.

In FIG. 5 is illustrated a structure to generate neutrino antineutrino pairs by using paramagnetic electron resonance or paramagnetic ion resonance techniques. In the structure illustrated in FIG. 5, paramagnetic ion resonance is achieved if crystals 41 and 42 are fabricated of ruby. It is important for crystals 41 and 42 to be large, nearly perfect, and be very stiff. Ruby crystals 41 and 42 include chromium ions that are excited to a paramagnetic resonance state by radiant electromagnetic energy from source 43, that can be either in the microwave or optical frequency range. Both of crystals 41 and 42 are simultaneously irradiated by source 43, a result attained by providing a relatively wide beam source that simultaneously causes photon energy to be incident on the side walls of both crystals. Alternatively, the end faces of the crystals can be simultaneously responsive to the electromagnetic radiant energy from source 43 by using an appropriate mirror arrangement (not shown).

Mechanical momentum is imparted to crystals 41 and 42 in much the same manner as mechanical momentum is applied to crystals 21 and 22. However, in the embodiment of FIG. 5, the mechanical momentum is imparted to crystals 41 and 42 by ferroelectric transducer 44, having electrodes (not shown) connected to supersonic source 45. Alternatively, a piezoelectric crystal, such as crystal 26, can be employed in the embodiment of FIG. 5; by the same token, a ferroelectric crystal can be employed in the embodiment of FIG. 4, instead of a piezoelectric crystal.

The ion resonance microwave or optical energy field applied to crystals 41 and 42 raises the paramagnetic moment-magnetic field interaction of all ions of crystals 41 and 42 having the same paramagnetic moments. Part of the energy of these ions is then transferred to neutrino antineutrino pairs. As in the embodiment of FIG. 4, the frequency chosen for supersonic source 45 must be one for which the masses of crystals 41 and 42, in combination with transducer 44, are mechanically resonant. This enables crystals 41 and 42 to oscillate as separate single entity masses. Dimensions of crystals 41 and 42 are chosen to prevent acoustic wave internal oscillations at the mechanically resonant frequency at which crystals 41, 42 and transducer 44 are resonant, with crystals 41 and 42 acting as mass points (lumped masses). Ferroelectric crystal 44 is clamped at its center so that the end faces thereof oscillate simultaneously toward and away from each other in response to excitation from source 45.

The neutrino antineutrino pairs generated by the structure illustrated in FIG. 5 is amplitude modulated by varying the current supplied by DC source 17 to coils 15 and 16 simultaneously with changes in the wavelength of source 43 so an ion or electron paramagnetic resonance is approximately retained in crystals 41 and 42. Alternatively, the amplitude of the neutrino antineutrino pairs derived by the generator of FIG. 5 is varied by changing the intensity of the radiant energy from source 43, as incident on crystals 41 and 42, or by varying the amplitude of the AC supplied by supersonic source 45 to crystal 44. The amplitude of the current from source 17 or the intensity of the radiation from source 43 or the amplitude of AC source 45 is controlled in response to the output of modulation signal source 46 which can be either analog or digital.

The structure illustrated in FIG. 5 can also be employed for paramagnetic electron resonance. If paramagnetic electron resonance is employed for generating neutrino antineutrino pairs, crystals 41 and 42 are large stiff low dislocation, semiconductor crystals of the type used as active elements of semiconductor lasers, e.g. GaAs crystals suitably alloyed to attain low dislocation density, as disclosed in Mooney, U.S. Pat. No. 4,916,088. Paramagnetic electron resonance is achieved in such crystals by irradiating them with optical electromagnetic radiant energy from source 43. The paramagnetic ion optical energy field applied to the crystals raises the paramagnetic moment-magnetic field interaction of all electrons of crystals 41 and 42 having the same paramagnetic moments. These electrons then transfer part of their energy to neutrino antineutrino pairs.

Figure 6:
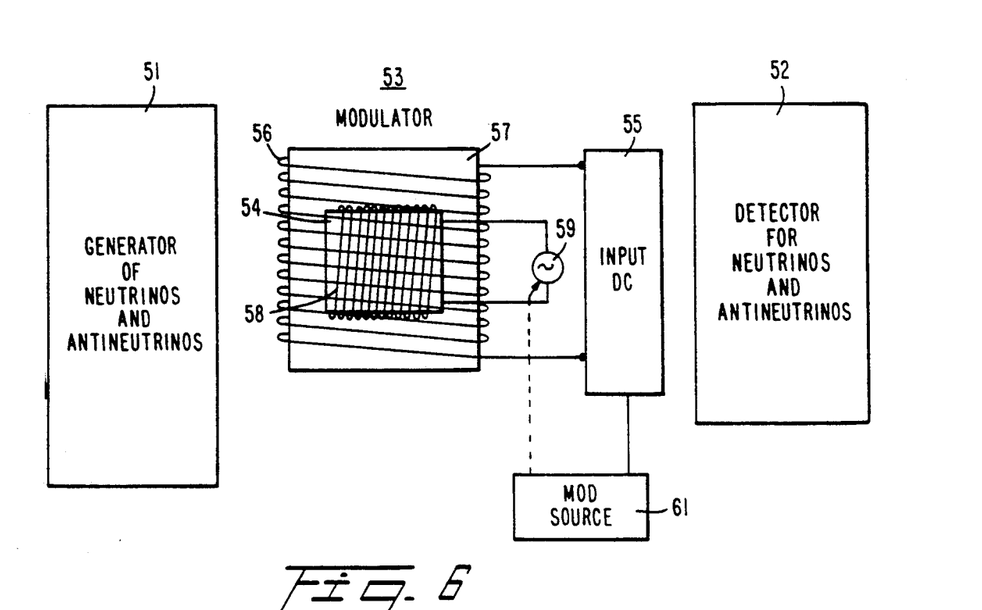
FIG. 6 is a schematic diagram of a neutrino antineutrino communication system including a modulator causing neutrinos and/or antineutrinos incident on a detector to be amplitude modulated concomitantly with the amplitude of an input signal.

According to a further aspect of the invention, illustrated in FIG. 6, a neutrino communication system includes neutrino antineutrino generator 51, which can be of the type illustrated in FIGS. 4 or 5, or a nuclear reactor, radioactive beta decay source or some other constant neutrino antineutrino source. Neutrino antineutrino detector 52, of the type described in either of my aforementioned patents, is positioned to be responsive to neutrinos from generator 51. Interposed between generator 51 and detector 52, in the path of the neutrinos propagated from the generator to the detector, is neutrino modulator 53, including large, nearly perfect, stiff crystal 54 having nuclear magnetic resonance properties, or paramagnetic ion resonance properties or paramagnetic electron resonance properties. In the specifically illustrated configuration, crystal 54 has nuclear magnetic resonance properties and, therefore, is selected from the group consisting of sapphire, diamond or silicon.

Crystal 54 is located in a DC magnetic field applied by source 55 to coil 56. Coil 56 is illustrated as being wound about magnetic core 57 in which crystal 54 is located. Alternatively, an air core can be employed or a superconducting coil can supply the DC magnetic field to crystal 54; in the latter situation, the coil is fabricated of rare earth metals, maintained at temperatures in the vicinity of liquid helium.

Wound on crystal 54 is coil 58, connected to be responsive to RF source 59, having a frequency to achieve nuclear magnetic resonance in the crystal for the applied DC magnetic field. Coil 58 is wound so that the RF magnetic field applied by it to crystal 54 is at right angles to the DC magnetic field applied to the crystal by coil 56. The magnitude of the DC magnetic field applied by coil 56 to crystal 54 is controlled by changing the output current of source 55 in response to the amplitude of modulation source 61 to vary the amplitude of the neutrino antineutrino pair flux incident on detector 52. As the current of source 55 is varied there is a simultaneous variation in the frequency of source 59 so a nuclear magnetic resonance is approximately retained in crystal 54. Alternatively, the amplitude of the RF peak voltage applied by source 59 to coil 58 can be controlled by the output of modulation source 61, to control the amplitude of the neutrinos incident on detector 52. By properly selecting the frequency of source 59 and the magnitude of the magnetic field produced by coil 56 (controlled by the current derived from source 55), as described in my '777 patent, crystal 54 scatters varying numbers of neutrinos and/or antineutrinos to provide the modulation function.

Figure 7:
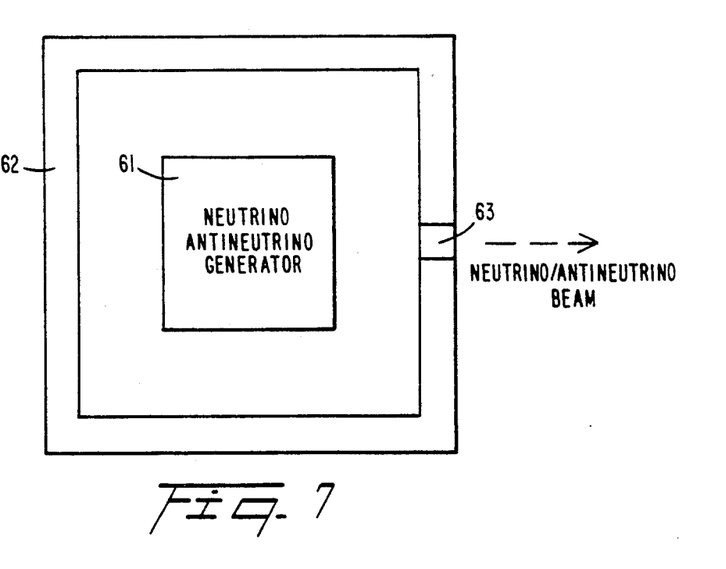
FIG. 7 is a schematic diagram of a structure for deriving a neutrino and/or antineutrino beam in response to neutrinos and/or antineutrinos produced by an isotropic generator thereof.

In accordance with a further aspect of the invention, illustrated in FIG. 7, a beam of neutrino antineutrino pairs is generated. In the structure illustrated in FIG. 7, isotropic neutrino antineutrino generator 61 is located in enclosure 62 forming a shield of neutrino antineutrino particles. Enclosure 62 includes an assemblage of large stiff single crystals having low dislocation density which are capable of scattering neutrinos and antineutrinos from generator 61. The crystals employed in enclosure 62 are large slabs of diamond, sapphire, ruby or silicon, or the semiconductor crystals used as active elements in semiconductor lasers.

Enclosure 62 is basically formed as a right parallelepiped that shields or restricts the output of neutrinos and antineutrinos from generator 61. The neutrino and/or antineutrino density builds up in enclosure 62 until the rate of leakage thereof through hole 63 in one wall of the enclosure equals the rate at which neutrino antineutrino pairs are produced by generator 61. A beam of neutrino antineutrino pairs thereby escapes from the interior of enclosure 62 through hole 63 which permits directivity of the derived neutrinos, to form a beam, as well as to control the rate of neutrino escape from the enclosure. A modulator of the type described in connection with FIG. 6 or as described in my '728 patent is placed downstream of hole 63, to be responsive to the neutrino antineutrino beam escaping from enclosure 62 through hole 63.

While there have been described and illustrated several specific embodiments of the invention, it will be clear that variations in the details of the embodiments specifically illustrated and described may be made without departing from the true spirit and scope of the invention as defined in the appended claims. For example, if crystals 21, 22 or 41, 42 are of a type having an internal magnetic field to satisfy the relationship $$H = \frac{E_v}{4\mu_m\beta \sqrt{2N}}$$

coils 15 and 16, as well as core 18, can be eliminated.

I claim:

1. In combination, an assembly in a region including DC magnetic lines of flux, said assembly including an electro-mechanical transducer, a single crystal bonded to said transducer, a source of AC energy coupled to the transducer, the frequency of the AC energy coupled to the transducer and the transducer and the crystal being arranged so that the transducer and crystal vibrate together relative to the DC magnetic lines flux in the region without setting up acoustic waves in the crystal, and means for applying energy to the crystal, the energy applied to the crystal by said energy applying means having a frequency causing magnetic or paramagnetic resonance of subatomic particles in the crystal, the frequency of the energy applied to the crystals to achieve the subatomic particle resonance being determined by the magnitude of the DC magnetic field in the crystals.

2. The combination of claim 1 further including means external to the crystal for establishing the DC magnetic lines of flux.

3. The combination of claim 2 wherein the crystal is a single crystal dielectric having a high Debye temperature and variable neutrinos.

4. The combination of claim 1 wherein the crystal has its own internal DC magnetic field to establish at least some of the DC magnetic lines of flux.

5. The combination of claim 1 wherein the subatomic particles are nuclei, the energy applying means including a coil for coupling an AC magnetic field to the crystals to cause magnetic resonance of nuclei in the crystals.

6. The combination of claim 1 wherein the subatomic particles are ions, the energy applying means including a radiant electromagnetic source for directing a radiant electromagnetic energy field to the crystals to cause paramagnetic resonance of ions in the crystals.

7. The combination of claim 1 wherein the subatomic particles are electrons, the energy applying means including a radiant electromagnetic source for directing a radiant electromagnetic energy field to the crystals to cause paramagnetic resonance of electrons in the crystals.

8. The combination of claim 1 further including a modulation source for controlling the amplitude of the AC energy coupled to the transducer to cause amplitude modulation of the neutrinos and antineutrino pairs derived from the combination.

9. The combination of claim 1 further including a modulation source for controlling the amplitude of the energy applied to the source causing magnetic or paramagnetic resonance of subatomic particles in the crystal to cause amplitude modulation of the neutrino and antineutrino pairs derived from the combination.

10. The combination of claim 1 further including a modulation source for varying the magnitude of the magnetic field in the region incident on the crystal to cause amplitude modulation of the neutrino and antineutrino pairs derived from the combination.

11. The combination of claim 1 wherein the electromechanical transducer includes opposed faces, a different one of the single crystals being bonded to the opposed faces of the transducer, the transducer being clamped between the opposed faces.

12. A method of amplitude modulating neutrino-type particles in response to a variable amplitude input signal comprising irradiating a stiff crystal with said particles, applying a DC magnetic field and another field having a magnetic component to the crystal to cause resonance of subatomic particles in the crystal, and varying the amplitude of one of said fields in response to the amplitude of the input signal to vary the number per unit length of time of said particles that propagate through the crystal.

13. A communicating apparatus responsive to a variable amplitude input signal comprising a source of neutrino-type particles, a neutrino scattering material in the path of said particles derived from the source, means responsive to the signal for altering a property of the material to vary the number per unit length of time of said particles that propagate through the material so that as the amplitude of the signal changes there are concomitant changes in the number per unit length of time of said particles propagating through the material.

14. The apparatus of claim 13 wherein the scattering material is a stiff crystal and the mans for altering the material property includes means for applying a DC magnetic field and another field having a magnetic component to the crystal to cause resonance of subatomic particles in the crystal and for varying the amplitude of one of said fields in response to the amplitude of the input signal to vary the number per unit length of time of said particles that propagate through the crystal.

15. The apparatus of claim 13 wherein the scattering material is a stiff crystal in a DC magnetic field and the means for altering the material property includes means for applying a field having a magnetic component to the crystal to cause resonance of subatomic particles in the crystal and for varying the amplitude of one of said fields in response to the amplitude of the input signal to vary the number per unit length of time of said particles that propagate through the crystal.

16. In combination, a generator of neutrino-type particles, an assemblage of stiff single crystals forming an enclosure around the generator, said crystals including subatomic particles capable of scattering neutrino-type particles, said assemblage including an aperture through which neutrino-type particles from the generator propagate to form a beam of neutrino-type particles.

17. In combination, a source of DC magnetic lines of flux for a predetermined region, an assembly in said region, said assembly including an electro-mechanical transducer, a single crystal bonded to said transducer, a source of AC energy coupled to the transducer, the frequency of the AC energy coupled to the transducer and the transducer and the crystal being arranged so that the transducer and crystal vibrate together relative to the DC magnetic liens of flux in the region without setting up acoustic waves in the crystal, and means for applying energy to the crystal, the energy applied to the crystal by said energy applying means having a frequency causing magnetic or paramagnetic resonance of subatomic particles in the crystal, the frequency of the energy applied to the crystals to achieve the subatomic particle resonance being determined by the magnitude of the DC magnetic field in the crystals.

18. The combination of claim 17 wherein the source of DC magnetic lines of flux includes means external to the crystal for establishing the Dc magnetic lines of flux.

19. The combination of claim 17 wherein the crystal has its own internal DC magnetic field, and the source of DC magnetic lines of flux includes the crystal internal DC magnetic field.

* * * * *

UNITED STATES PATENT AND TRADEMARK OFFICE
CERTIFICATE OF CORRECTION

PATENT NO. : 5,276,717
DATED : January 4, 1994
INVENTOR(S) : Joseph WEBER

It is certified that error appears in the above-indentified patent and that said Letters Patent is hereby corrected as shown below:

Column 8, line 11, change "cubic" to --square--.
Column 9, line 15, delete the formula and replace with:

$$P = \frac{\pi G_\omega^2 E_v^3 [N_T - Z_T(1-\sin^2\theta_w)]^2}{\hbar^4 c^3 V}$$

Column 14, line 5, change "mans" to --means--.
Column 14, line 37, change "liens" to -- lines--.
Column 14, line 48, change "Dc" to --DC--.

Signed and Sealed this

Thirtieth Day of August, 1994

Attest:

BRUCE LEHMAN

*Attesting Officer*    *Commissioner of Patents and Trademarks*